United States Patent Office 3,475,495
Patented Oct. 28, 1969

3,475,495
REMOVING PALLADIUM COMPOUNDS FROM
AQUEOUS GLYOXAL SOLUTIONS
Rolf Platz, Mannheim, and Karl Gerhard Baur, Ludwigshafen (Rhine), Germany, assignors to Badische Anilin- & Soda-Fabrik Aktiengesellschaft, Ludwigshafen (Rhine), Rheinland-Pfalz, Germany
No Drawing. Filed Sept. 26, 1967, Ser. No. 670,776
Claims priority, application Germany, Oct. 5, 1966,
B 89,215
Int. Cl. C07c 45/04, 47/12; C02b 1/60
U.S. Cl. 260—604                                   6 Claims

ABSTRACT OF THE DISCLOSURE

The separation of palladium compounds from aqueous glyoxal solutions (obtained by the oxidation of ethylene by means of nitric acid) by means of anion exchanger resins.

---

The present invention relates to a new method for removing palladium compounds from aqueous glyoxal solutions which have been obtained by oxidation of ethylene by means of nitric acid.

It is known from U.S. patent specification No. 3,333,004 that ethylene can be oxidized to glyoxal with aqueous nitric acid in the presence of palladium compounds and in the presence or absence of oxygen. The reaction mixture thus obtained is an aqueous solution which in general contains 5 to 20% by weight of glyoxal, 0.5 to 5% by weight of nitric acid, and neutral and acid organic byproducts. The reaction mixture also contains the palladium (used as catalyst) in the form of compounds which are not precisely known.

Quantitative recovery of the palladium serving as catalyst is of decisive importance for economical operation of this method of preparing glyoxal. Quite apart from this it is necessary to remove traces of metal from the glyoxal solution for industrial use of the same.

Whereas the removal of neutral and acid organic impurities does not offer any particular difficulty, it has not been possible hitherto to remove the palladium compounds in a simple and quantitative manner. Although the metal is separated in very finely divided elementary form by reducing agents, for example ethylene itself, the separation of the metal sludge and of the colloidally dissolved residues offers difficulty. At the same time the use of the usual reducing agents introduces fresh contaminants into the solution.

It is recommended in U.S. patent specification No. 3,290,378 that traces of metal ions in aqueous glyoxal solutions should be removed by treatment with a cation exchanger resin. It is however not possible by this method to remove palladium compounds, which are probably present in the form of chelate complexes.

It is known from German patent specification No. 1,222,485 that palladium compounds may be extracted from aqueous solutions by means of gas oil. Simultaneous extraction of glyoxal with the palladium compounds by the gas oil cannot however be completely avoided in this method.

Since prior art methods for separating palladium compounds from aqueous glyoxal solutions obtained by oxidation of ethylene with nitric acid are unsatisfactory, the object of the present invention is to provide a new more efficient method for this purpose.

We have found a simple method for removing palladium compounds from aqueous glyoxal solutions obtained by oxidation of ethylene with nitric acid in which the solutions are treated with an anion exchanger resin.

Since the palladium content of a solution of palladium chloride or palladium nitrate in dilute nitric acid is not appreciably decreased when the solution is treated with an anion exchanger, and since moreover glyoxal solutions containing palladium undergo no change in the palladium content when treated with cation exchangers, and since moreover the fact that gas oil is a suitable extractant suggests the presence of undissociated palladium chelates, it is surprising that a quantitative separation of palladium can be achieved by the new process.

No troublesome impurities whatever are introduced into the solution by the new process. The separation of palladium is quantitative. The exchanger resin is readily regeneratable, palladium being obtained again in a form immediately suitable for the production of glyoxal. There is no loss of palladium whatever.

All conventional anion exchanger resins are suitable for the new process. They are insoluble crosslinked polycondensates or polymers which contain amine groups or ammonium groups attached via at least one carbon atom to the macromolecular chain, for example $-NH_2$,

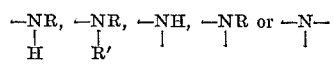

groups, the free valencies indicating in each case the attachment to the macromolecular chain and R and R' denoting in general lower alkyl radicals which may bear hydroxyl groups or alkoxy groups as substituents. Such anion exchangers, which are called polyalkylenamine resins, polyalkylenimine resins or aromatic amine resins, are available in commerce for example under the names: Duolite A–30, Lewalit MN, Wofatit L 165, Dowex 3 and Amberlite 1R–4B.

The products known as strongly basic anion exchangers which contain quaternary ammonium groups may be used with particular advantage. These are crosslinked polymer resins which bear, attached to the macromolecular chain via one carbon atom, groups having the formula

in which R, $R^1$ and $R^2$ denote lower alkyl radicals which may or may not bear hydroxyl groups or alkoxy groups as substituents. The radicals R, $R^1$ and $R^2$ in the commercial products (Amberlite IRA 400, Amberlite IRA 410, Dowex 1, Permutit ES, Wofatit SBS 400) are preferably methyl or β-hydroxyethyl groups. Polymers which contain the groups:

or

incorporated into the macromolecule may however also be used.

For the production of the various anion exchanger resins reference is made to the appropriate chapters of the treatise "Ionenaustauscher" by F. Helfferich, Verlag Chemie, Weinheim, 1959.

The anion belonging to each of the ammonium groups resulting from the addition of a proton on to the amine group or belonging to each quaternary ammonium group may be chosen at will and may be for example a chloride ion, bromide ion, sulfate ion, acetate ion, formate ion or hydroxyl ion. As far as the removal of palladium is concerned, the type of anion present in the exchanger is practically without importance for the process according to the invention. To simplify the further purification of the aqueous glyoxal solution however an anion which is already present in the aqueous solution is advantageously chosen, particularly the nitrate anion. Since in general the content of nitric acid in the aqueous glyoxal solution is several orders of magnitude higher than that of the palladium, an exchange for nitrate ions automatically takes place at the beginning of the treatment with an anion exchanger having any chosen anion.

The new process is suitable for the purification of aqueous glyoxal solutions which have been prepared by oxidation of ethylene with nitric acid, with or without using oxygen, in the presence of palladium compounds. Such a method is described for example in U.S. patent specification No. 3,333,004.

In addition to water, the solutions contain as a rule 1 to 40%, particularly 5 to 20%, by weight of glyoxal, 0.1 to 10%, particularly 0.5 to 5%, by weight of nitric acid, 0 to 5%, particularly 0.5 to 2%, by weight of organic impurities, mainly organic acids, such as acetic acid, glyoxylic acid and oxalic acid, and about 0.01 to 1%, particularly 0.03 to 0.1%, by weight of palladium in the form of soluble palladium compounds whose composition is not known. It is advantageous to remove, prior to the treatment with an anion exchanger resin, organic impurities which boil below 100° C., for example by distillation or by passing in a gas (stripping). The nitric acid content of the solution to be purified is advantageously not more than 5% by weight because at the higher concentrations of nitric acid the separation of palladium proceeds less selectively.

To carry out the process, the solution may be intimately mixed with the anion exchanger resin which is advantageously used in a particle size of about 0.1 to 1 mm., for example in a stirred vessel, a solution free from palladium being obtained by decantation. It is advantageous to use a column filled with the resin through which the solution is allowed to flow. The process may easily be made continuous in this way. The temperature of the treatment is not critical and may be from about 0° to about 80° C. It is preferable however to carry out the process at room temperature. The residence time (time of treatment) may vary within wide limits and is usually from about 1 minute to 100 minutes. The optimum residence time may be ascertained easily by experiment.

Further processing of the glyoxal in order to remove nitric acid and organic acids is carried out in the conventional manner and is not the subject of the present invention.

Regeneration of the anion exchanger resin loaded with palladium compounds is advantageously carried out with nitric acid. A nitric acid concentration of 20 to 30% by weight, particularly 25 to 30% by weight, is used in general. The temperature used should not exceed 50° C. and is preferably room temperature. After the exchanger resin has been treated with nitric acid, it is immediately ready for use for palladium separation. The palladium-containing nitric acid resulting from the regeneration may be used directly for oxidation of ethylene to glyoxal, for example by the process described in U.S. patent specification No. 3,333,004.

EXAMPLE 1

10 liters of an aqueous 8.5 weight percent glyoxal solution which contains 2.0% by weight of nitric acid, 1.5% by weight of organic acids and 0.05% by weight of palladium in the form of an anion complex not precisely identified is passed within forty-eight hours through an exchanger column having a diameter of 30 mm. and a length of 1000 mm. which is filled with an exchanger resin based on crosslinked polystyrene containing a quaternary ammonium group as nitrate (commercial product Permutit ES). The palladium content of the effluent colorless glyoxal solution is less than 1 p.p.m. The loading of the exchanger resin with the palladium complex is clearly visible by the dark brown color.

When all the glyoxal solution has been supplied, the ion exchanger is washed with water and then eluated countercurrently with 8 liters of 30% nitric acid. The whole of the palladium is now present in the nitric acid. After the ion exchanger has been washed with water it may be used again for purifying glyoxal solution.

EXAMPLE 2

10 liters of an aqueous 10 weight percent glyoxal solution which contains 2.2% by weight of nitric acid, 1.6% by weight of organic acids, 1.8% by weight of organic impurities boiling below 100° C. and 0.05% by weight of palladium in the form of compounds not precisely identified, is freed from low boiling organic contaminants by passing nitrogen countercurrently at a temperature of 80° C. through a bubble-tray column having twenty actual trays. It is then supplied within forty-eight hours to an exchanger column 30 mm. in diameter and 1000 mm. in length which is filled with a strongly basic anion exchanger resin (commercial product Permutit ES in the chloride form). The anion exchanger has previously been converted into the nitrate form by being washed with 10% by weight nitric acid. The palladium content of the effluent colorless glyoxal solution is less than 1 ppm. After all the glyoxal solution has been supplied, the ion exchanger is washed with water and then eluated with 10 liters of 30% nitric acid. The whole amount of palladium is contained in the nitric acid which is returned to the glyoxal process (ethylene oxidation). After the ion exchanger has been washed with water, it is ready for reuse for treating the palladium-containing glyoxal solution described above.

We claim:

1. In a continuous process for producing glyoxal by oxidizing ethylene with aqueous nitric acid in the presence of a catalytic amount of a palladium salt, said oxidation reaction taking place in a reaction vessel, the improvement which comprises: passing the solution formed in the oxidation reaction from said reaction vessel through an anion exchange resin to remove palladium compounds; treating the palladium loaded anion exchanger with nitric acid to remove said palladium compounds; and returning said nitric acid containing said palladium to said reaction vessel for use in oxidizing ethylene.

2. A process as claimed in claim 1 wherein the anion exchanger resin used contains quaternary ammonium groups as basic groups.

3. A process as claimed in claim 1 wherein the solution is intimately mixed with the resin which has a particle size of from 0.1 to 1 mm.

4. A process as claimed in claim 1 wherein the resin is placed in a column and the solution is passed through the same.

5. A process as claimed in claim 1 carried out at from about 0° C. to about 80° C.

6. A process as claimed in claim 1 carried out at room temperature.

References Cited

UNITED STATES PATENTS

| | | | |
|---|---|---|---|
| 2,409,441 | 10/1946 | Metzger | 210—37 X |
| 2,753,258 | 7/1956 | Burstall et al. | 210—37 X |
| 3,118,831 | 1/1964 | Morris | 210—38 |
| 3,290,378 | 12/1966 | Tsunemitsu et al. | 260—603 X |
| 3,333,004 | 7/1967 | Platz et al. | 260—601 |

FOREIGN PATENTS 594,339  11/1947  Great Britain.

REUBEN FRIEDMAN, Primary Examiner

C. M. DITLOW, Assistant Examiner

U.S. Cl. X.R.

210—30, 37, 38